(12) United States Patent
Sorensen et al.

(10) Patent No.: US 11,054,345 B2
(45) Date of Patent: Jul. 6, 2021

(54) MULTI-SUBSTRATE SUBTIDAL SAMPLER

(71) Applicants: Kara C. Sorensen, San Diego, CA (US); Ignacio D. Rivera, San Diego, CA (US); Bart Chadwick, San Diego, CA (US); Chuck Katz, San Diego, CA (US); Cassandra Sosa, Chula Vista, CA (US)

(72) Inventors: Kara C. Sorensen, San Diego, CA (US); Ignacio D. Rivera, San Diego, CA (US); Bart Chadwick, San Diego, CA (US); Chuck Katz, San Diego, CA (US); Cassandra Sosa, Chula Vista, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 154 days.

(21) Appl. No.: 16/514,100

(22) Filed: Jul. 17, 2019

(65) Prior Publication Data
US 2020/0408648 A1 Dec. 31, 2020

Related U.S. Application Data

(60) Provisional application No. 62/867,690, filed on Jun. 27, 2019.

(51) Int. Cl.
*G01N 1/10* (2006.01)
*G01N 1/04* (2006.01)
*G01N 1/12* (2006.01)

(52) U.S. Cl.
CPC ............... *G01N 1/10* (2013.01); *G01N 1/04* (2013.01)

(58) Field of Classification Search
CPC .. G01N 1/10; G01N 1/04; G01N 1/12; G01N 2001/1025; E02D 1/04; E02D 1/025; E02D 1/022; E21B 49/02; E21B 25/00
See application file for complete search history.

(56) References Cited

U.S. PATENT DOCUMENTS

| | | | | |
|---|---|---|---|---|
| 2,137,128 A | * | 11/1938 | Blake | G01N 1/12 73/864.65 |
| 7,231,840 B1 | * | 6/2007 | O'Kane | G01N 1/12 73/864.63 |

FOREIGN PATENT DOCUMENTS

DE            4318347 A1 * 12/1994 ............... G01N 1/08

OTHER PUBLICATIONS

English machine translation for document DE 4318347.*

* cited by examiner

*Primary Examiner* — Peter J Macchiarolo
*Assistant Examiner* — Anthony W Megna Fuentes
(74) *Attorney, Agent, or Firm* — Naval Information Warfare Center, Pacific; Kyle Eppele; James R. McGee

(57) ABSTRACT

A method for collecting samples of one or more substrate can include the steps of: A) providing a sample collection tube having a first end and a second end, B) providing a cap pivotable about the first end and a footplate pivotable about the second end, C) biasing the cap and the footplate closed so that a watertight compartment can be established inside the tube; D) forcing the cap and the footplate open by attaching the cap and footplate to a releasable fastener, E) positioning the sample collection tube into the one or more substrate to collect the sample, followed by F) releasing the cap and footplate from the releasable fastener so that a watertight compartment is established inside the tube when the cap and the footplate are closed.

20 Claims, 8 Drawing Sheets

MULTI-SUBSTRATE SUBTIDAL SAMPLER

CROSS-REFERENCE TO RELATED APPLICATIONS

This application is a nonprovisional application claiming priority to U.S. Patent Application Ser. No. 62/867,690, filed on Jun. 27, 2019, entitled "Multi-Substrate Subtidal Sampler," the entire content of which is fully incorporated by reference herein.

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac_t2@navy.mil. Reference Navy Case No. 110686.

BACKGROUND OF THE INVENTION

The present invention is generally drawn to sampling devices for repeatedly, consistently, and quantitatively collecting one or more substrates in a single sampling process.

Current protocols for monitoring planktonic algae in water samples are well developed and are applied routinely for all types of waterbodies. However, for waterbodies where benthic macroalgae is predominant the protocols are not as well developed. In these instances, the protocol calls for collecting a limited number of samples in the intertidal zone and applying the results to the entire waterbody. Standard intertidal method of collection is via the calculation of percent cover using the point intercept method with a $0.5 \times 0.5$ m$^2$ quadrat. As a result, large portions of the waterbody (in particular the subtidal areas) go unmeasured. And even for the waterbody portions that are measured, if the manner of collecting samples is more qualitative then quantitative, estimation of total biomass can under or over represent resulting current conditions in that waterbody.

In California, standardized methods exist for monitoring intertidal macroalgae (McLaughlin et al. 2013, 2019). However, a standardized protocol to assess microalgae biomass in the subtidal habitat is yet to be adopted. This is partially due to the challenge/constraints of sampling floating algae or subtidal benthic algae, such as: (1) visibility limitations; (2) need for sampling from boat or small vessel and/or potential need of a diver; (3) use of less useful forms of collection such as a van Veen grab (which may not retain samples in a watertight compartment); (4) use of some form of CORE sampling which can require certain minimum size vessel (which may not be available, or have too large a draft to sample in subtidal areas); (4) sampling limitation, which can be based on reach of the sampler's arm if taking a wadeable sampling approach; (5) depth variation impacting type of vessel that can be used; and, (6) a combination of any and/or all of the above. Accordingly, for at least the foregoing reasons there can exist a need for a standard device for quantitatively, consistently collecting microalgae biomass in the subtidal zone. It is further appreciated that the device can be used to collect sediment for bulk chemistry (e.g. total nutrients and organic carbon), benthic chlorophyll-a, and macroalgae in one sample.

SUMMARY OF THE INVENTION

Embodiments of this invention can include a method for collecting a sample of one or more subtidal substrates. The method can include the step of providing a sample collection tube having a first end and a second end. The method can further include the step of providing a cap pivotable about the first end and a footplate pivotable about the second end. The method can further include the step of biasing the cap and the footplate closed so that a watertight compartment is established inside the tube when the cap and the footplate are closed. The method can further include the step of forcing the cap and the footplate open by attaching the cap and the footplate to a releasable fastener. The previously mentioned step may be accomplished by releasably attaching the cap and the footplate at the same attachment point, which can be at the geometric center of the cap. Alternatively, said attachment point may be the hook in a hook and pin configuration of the releasable fastener.

The method can further include the step of positioning the sample collection tube into one or more substrate to collect the sample. The method can further include the step of releasing the cap and footplate from the releasable fastener so that a watertight compartment is established inside the tube when the cap and the footplate are closed. The step of releasing the cap and footplate can be accomplished by pulling a trigger line guided by a trigger line guide. The trigger line can be attached to a pin of the releasable fastener. The trigger line guide can allow a component of the force which is applied to the trigger line to be applied in a direction substantially along a center axis of the pin, to facilitate remote activation.

The method can further include the step of mounting a stop to the outside surface of the collection tube. The method can further comprise the step of submerging the collection tube into the one or more substrates until the stop contacts a sediment-substrate. The method can further comprise the release of the first cap to cover an aperture of the collection tube at the first end of the tube. The method can further comprise the step of raising the collection tube out of the sediment-substrate. The step of raising the collection tube out of the sediment-substrate can cause the footplate to close once the second end clears the sediment-substrate. The cap and the footplate being closed can re-establish a watertight compartment within the collection tube.

The step of positioning the sample collection tube into the subtidal substrate to collect the sample can require removing the device from a stand. The stand can allow for sufficient resistance to the user to perform the forcing open and biasing closed steps.

The method can further include the step of providing an arm coupled to the footplate. The arm can comprise a mechanism, which can be configured to maintain the footplate in the open (once forced and held open as described below) and closed positions. The arm can have a rigid member fixedly attached to the outside of the core tube. The rigid member may have a portion perpendicular to the core tube. The arm can have a second rigid member threaded internal to a footplate spring. The arm can have a swinging member coupled perpendicularly to the footplate and attached to a first end of a hinge. A first end of the second rigid member can be attached to a bulb. A second end of the second rigid member can be attached to a second end of the hinge. The hinge and a portion of the swinging member can be internal to first rigid member. The footplate spring can be configured to bias the footplate closed.

A device for collecting a sample of one or more substrates according to several embodiments can include a collection tube having a first end and a second end. The device can further include a cap pivotable about the first end and a footplate pivotable about the second end. The device can further include a releasable fastener, which can releasably attach to the first and footplate. The device can include a trigger line coupled to the releasable fastener, which can be pulled by a user of the device. A trigger line guide can guide the trigger line towards the releasable fastener. The cap and the footplate can be biased towards respective closed positions so that a watertight compartment is established inside the collection tube when the cap and the footplate are closed. The trigger line guide can allow for a portion of the force, which is applied to the trigger line to transfer to a component of the releasable fastener.

The releasable fastener can have a hook and pin configuration with the trigger line attached to the pin. The trigger line guide can allow a component of the force, which is applied to the trigger line to be applied in a direction substantially along the center of the pin. The device can have a stop mounted to the outside surface of the collection tube. The collection tube can be configured to be submerged into the subtidal substrate until the stop contacts a sediment-substrate portion of the subtidal substrate. The device can be configured so that when the trigger line is pulled when the stop contacts the sediment-substrate, the cap is released into the closed position. When the device is raised and the second end clears the sediment-substrate, the footplate can pivot into the closed position to establish a watertight compartment within the collection tube. The raising of the device can cause the footplate to close.

The collection device can further include a stand, which can allow for sufficient resistance for forcing open and biasing closed the first and footplate.

The collection device can further include an arm coupled to the footplate. The arm can further include a mechanism, which maintains the footplate in the open or closed positions. The arm can have a rigid member fixedly attached to the outside of the core tube. The rigid member may have a portion perpendicular to the core tube. The arm can have a second rigid member threaded internal to a footplate spring. The arm can have a swinging member coupled perpendicularly to the footplate and attached to a first end of a hinge. A first end of the second rigid member can be attached to a bulb. A second end of the second rigid member can be attached to a second end of the hinge. The hinge and a portion of the swinging member can be internal to first rigid member. The footplate spring can bias the footplate closed.

BRIEF DESCRIPTION OF THE DRAWINGS

The accompanying drawings, which can be incorporated in and form a part of the specification, illustrate example embodiments and, together with the description, serve to explain the principles of the invention. In the drawings.

DETAILED DESCRIPTION OF THE EMBODIMENTS

Aspects of the present invention are drawn to a system and method for collecting samples within a collection tube.

Example systems in accordance with the first inventive aspect of the present invention will now be described with reference to FIGS. 1-7.

In accordance with aspects of the present invention, a Multi-Substrate Subtidal Sampler (SUBS) is a sampling device that can consistently and quantitatively collect sediment, microalgae biomass, benthic algae, water, and other sediments (each individually a substrate), from the subtidal habitat in a single sampling process. Substrates can be liquids, solids, dissolved solids. Substrates can be organic or inorganic.

Figures 1A, 1B:
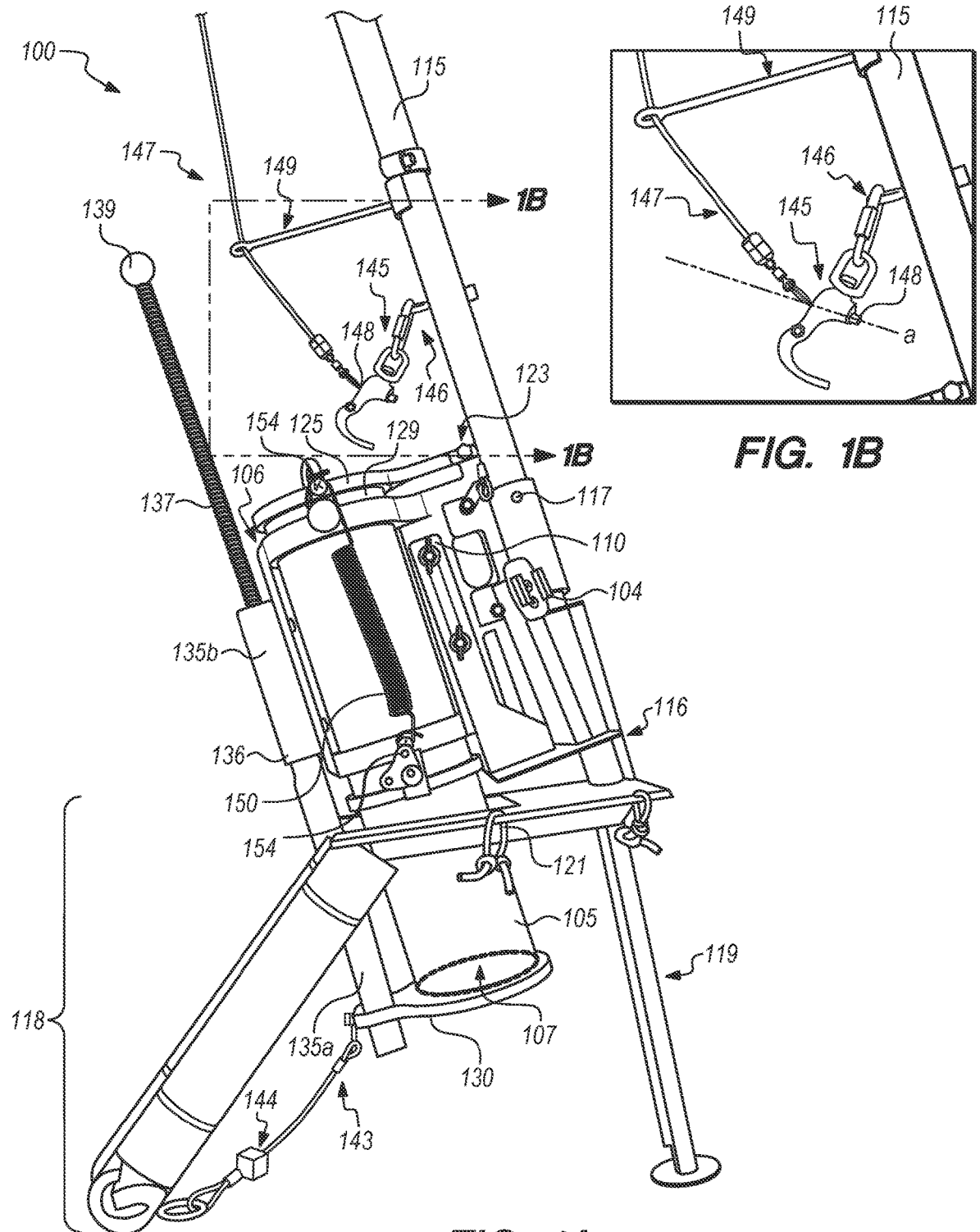
FIG. 1A can illustrate a basic device structure and operational procedure of the device 100 according to several embodiments.
FIG. 1B can illustrate an enlarged portion of the basic device structure, taken along line 1B-1B in FIG. 1A.

Referring initially to FIG. 1A, FIG. 1A can illustrate a SUBS device structure and operational procedure of the device 100 in accordance with said aspects of the present invention. The device 100 can include a core tube (or collection tube) 105 for collecting a sample of substrates (liquids, solids, biomass, etc.) in a watertight compartment within the core tube 105. The core tube 105 can have a 10.16 cm (inner diameter) cylindrical polycarbonate beveled and/or tapered core tube 105. Other diameters and shapes can certainly be possible, provided the device can maintain a watertight compartment as it if operated as described below. The device 100 can be designed with varying core tube 105 lengths. A short sampler core tube 105 can have a 30.48 cm length and a long sampler core tube 105 can have a 40.64 cm length. The core tubes 105 can be interchangeable (i.e. frame 110 shown in FIGS. 1-2 can be adjustable for core tubes 105 of varying lengths). The core tube 105 can have 2 circumferential edges, a first edge 106, and a second edge 107. These edges 106, 107, may have a tapered and/or beveled profile. The device 100 can have a stainless-steel and anodized aluminum collection frame 110 that can have an aluminum telescopic "trigger" pole 115 attachment.

The collection frame 110 can also allow for connecting one or more underwater cameras via one or more camera connectors 104. An adjustable sediment hard stop 116 can be attached to the collection frame 110, on the outside of the core tube 105. The adjustable sediment hard stop 116 may have a member disposed in a plane, where the plane can be substantially perpendicular (within 5 degrees) to a longitudinal axis of the core tube 105. The adjustable sediment hard stop 116 may have a mechanism for adjusting a height of the member to the bottom of the core tube 105 defined by bottom edge 107. The longitudinal axis of the core tube 105 may perpendicularly dissect apertures defined by circumferential edges 106, 107 of core tube 105.

The pole 115 can be attached onto the collection frame 110 with a fastener, such as a pole attachment pin 117. The pole 115 can be removable from the collection frame 110. The pole 115 can have grips on the end of the pole (not shown in the FIGs.) farther from the collection frame 110. The pole 115 can have a length that is adjustable depending on the depth of the subtidal zone to be sampled. Any length is possible as long as the line of the trigger line 147 length can be sized accordingly. The pole can have a length of 3.66 meters long.

A small craft sampler deployment stand (SDS) 118 can be used to stand the device within a small craft, such as a boat, dinghy, kayak, or the like. The SDS can have an aperture at least slightly larger than an outer diameter of the core tube 105, for receiving core tube 105, so that the core tube can fit in a plane of the SDS 118. The SDS 118 can be deployed to a small craft (not shown in FIGs.), such as a kayak, a boat, or a canoe. The SDS can be made of stainless steel, or rigid material resistant to corrosion. The SDS 118 can be designed to allow for mounting and loading of the SUBS device 100 from a vessel such as a kayak. The SDS 118 can enable enough resistance for engagement into the collection position. It also serves as a holder for the device 100 while kayaking between stations as well as a holder for the release of collected sample for processing. SDS 118 can include holes 121 for attaching the stand 118 to the kayak as well as camera connectors (not shown) for attaching one or more cameras.

The SDS 118 can be adjustable, such that the device can be elevated a certain height above the small craft. To adjust the SDS, legs 119 may be adjustable legs to allow for use in multiple types of kayaks/small vessels. The collection frame 110 may be attached to the SDS 118, at a portion of the collection frame 110 that also attached to the trigger pole 115. The collection frame 110 may be attached to the SDS 118 with a slotted collection frame 110, and a pin (not shown). The collection frame 110 may be removable from the SDS. Total weight for each SUBS device 100 (empty w/out sediment hard stop 116) can be 3.4 kg for a short core tube 105 or up to 5 kg for a long core tube 105. Other device 100 weights are certainly possible and can depend on the size and material selected.

Figure 2:
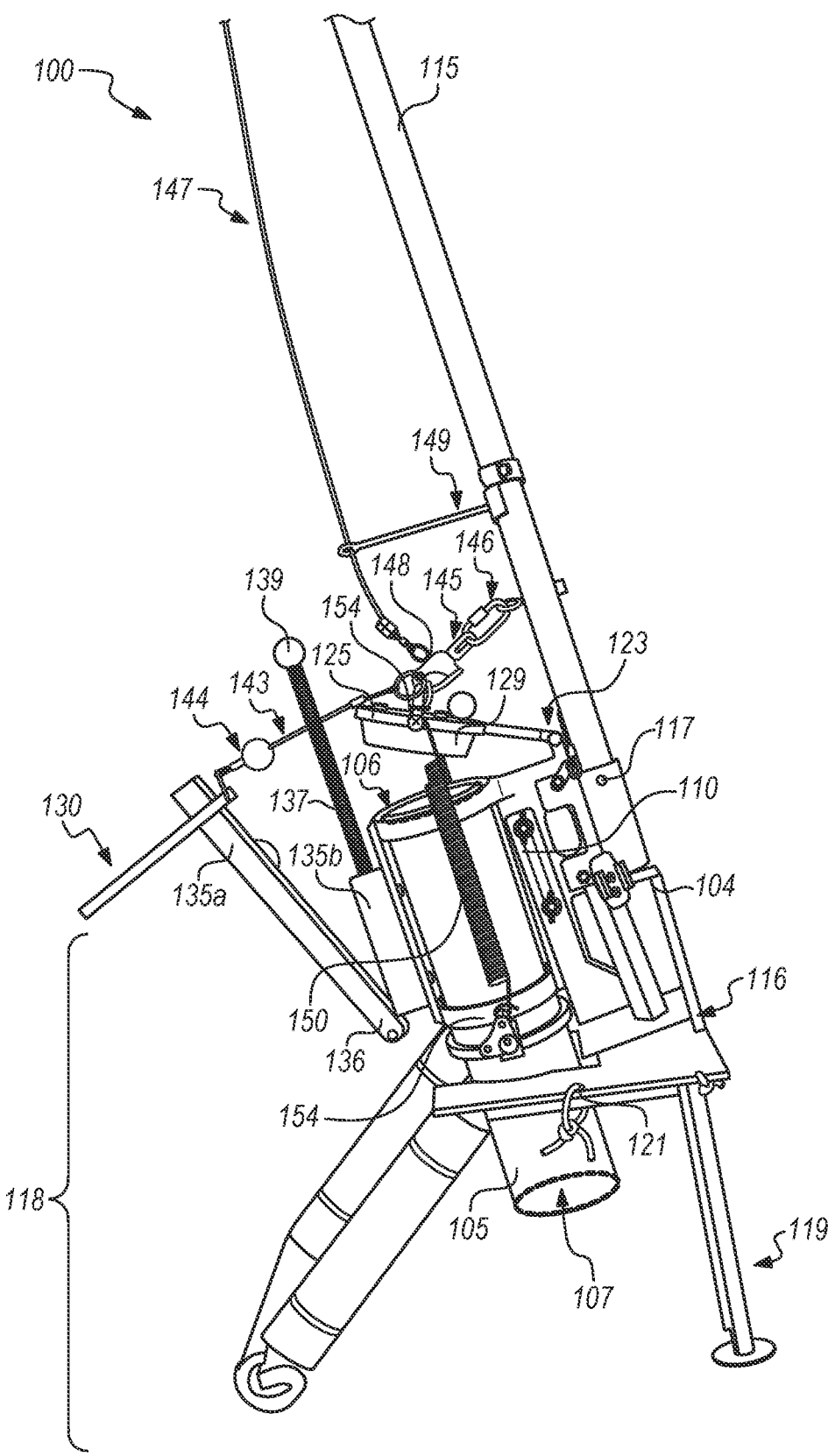
FIG. 2 can illustrate the device being "loaded" on the stand.
Figure 3:
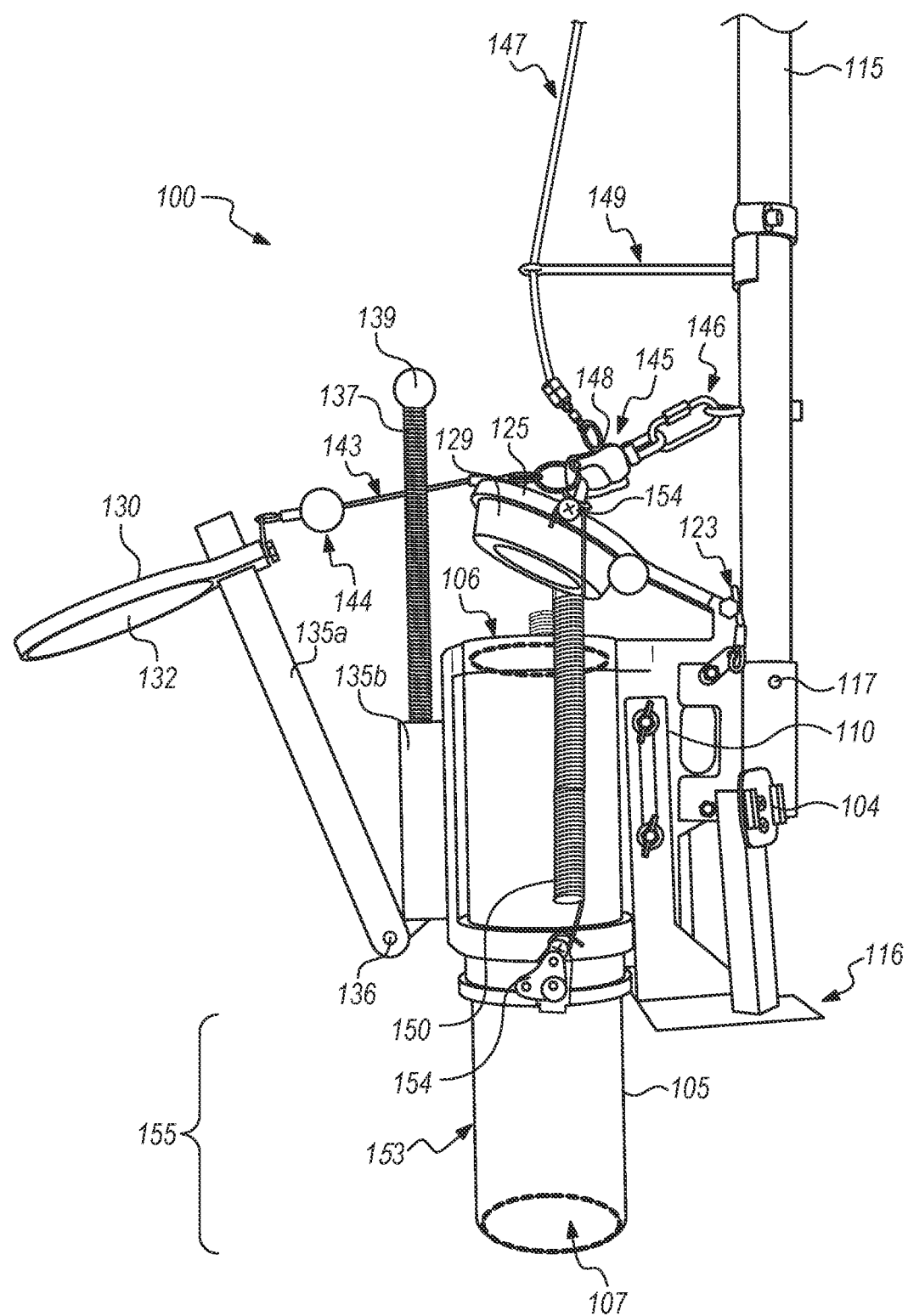
FIG. 3 can illustrate the device when it has been "loaded" and removed from the stand, as ready for sample collection.

As shown in FIGS. 1-3, there can be a cap 125 near the top of the core tube 105, and the cap 125 can contact edge 106 to establish a watertight seal and plug and/or cap an aperture defined by edge 106 of the core tube 105. Cap 125 can be attached via a hinge 123 to the collection frame 110. The cap 125 may be pivotable about the core tube 105. The cap 125 can be hinged such that a sample can collect within the core tube 105. The cap 125 may have a stopper 129, such as a rubber stopper or a gasket. The stopper 129 may prevent the sample from leaving the aperture defined by the edge 106 of the core tube 105 when the cap 125 is in a closed position. There is a footplate 130 which, when in a closed position, can be located near the edge 107 of the core tube 105, opposite of the cap 125. The present invention can further include a footplate 130. Footplate 130 can be formed similar to the cap 125, with a stopper between the core tube 105 and an outer surface of the footplate 130, so that footplate 130 establishes a somewhat watertight seal, or a complete watertight seal when it contacts edge 107. To do this, footplate 130 may have a rough material 132, such as felt or carpeting, located between the core tube 105 and an outer surface of the footplate 130. The rough material can create a sealing effect that can be sufficient to prevent a sediment from leaving the core tube 105 when the footplate 130 is in a closed position and a sediment is contained in core tube 105. The core tube 105 can be beveled and/or tapered at the perimeter of the end(s) of the core tube 105, for example at edge 107, where the core tube 105 meets the cap 125 and/or the footplate 130. The footplate 130, in the closed position, may plug and/or cap an aperture defined by edge 107.

As described above and perhaps best seen in FIGS. 2-3, the device 100 of the present invention can further include a footplate 130, which can be attached to an arm 135. The footplate 130 may be 90 degrees offset from the arm 135. The arm 135 can be a rigid member that can have two portions (135a, 135b) which can pivot about an axis. The portion of the arm 135a which has the footplate 130 attached to it, may be partially internal to a portion of the other arm portion 135b (and thus may have a smaller width). The portion of the arm 135a which is attached to the footplate 130 may be a swinging portion 135a. Portion 135b may be portion fixedly attached to the core tube 105. The two portions of the arm 135 may be joined by a hinge 136. The hinge 136 may be internal to one of the arm portions, for example the portion of the arm 135b closer to an arm spring portion 137.

The arm 135 can be made of aluminum, or another rigid and/or non-corrodible material. The arm can have a swingable portion 135a, fixed perpendicular to the footplate 130. The arm can have a fixed portion 135b, fixed to the core tube 105 and/or collection frame 110. The arm 135 can have an arm spring 137 portion. The arm spring 137 may be compressed to a length shorter than the relaxed, natural length of the spring. The arm spring 137 may be compressed for the use of the device 100, and from the fully close to fully open position of the foot 130. A rigid member may be threaded internal to the arm spring 137 and internal to the fixed portion of the arm 135b. Said rigid member threaded internal to the arm spring 137, may have a bulb 139 on one end, and may be attached to a part of the hinge 136 on the other end. It may be attached to the part of the hinge 136 other than the part of the hinge attached to the footplate 130 portion 135a of the arm 135.

The rigid member threaded internal to arm spring 137 may have a length such that the spring is never completely relaxed, but rather in an extended (more relaxed) state, there is still an extension force on the arm spring 137. In other words, when extended (more relaxed), the arm spring 137 would still maintain a force on the bulb 139, and a pulling force on the swingable portion 135a of the arm attached to the foot 130, as the extended length of the spring would still be smaller than a natural length of the spring. Thus, the arm spring 137 may be compressed for the use of the device 100, and throughout the full rotation of swinging portion 135a of the arm, from the fully closed to fully open position of the foot 130. The arm spring 137 can allow for an acting force on the portion 135a of the arm 135 attached to the footplate 130, (and thus the footplate 130).

When the arm spring 137 is extended (or relaxed), the spring portion of the arm is longer than when the spring 137 is compressed. When the arm spring 137 is relaxed, the hinge 136 between the two rigid portions of the arm 135 may not exposed and can be internal to the portion 135b of the arm 135, other than the portion 135a attached to the footplate 130. When the arm spring 137 is relaxed, the extension force of the spring may allow the footplate 130 to be tight against the core tube 105, so that a sample (i.e. sediment) internal to the core tube 105 does not leave the core tube.

When the arm spring 137 is compressed (for example by pressing the bulb 139 atop of the arm spring 137 portion of the arm 135), the portion of the arm 135a which is attached to the footplate 130, may extend so that the hinge 136 is exposed, and the portion of the arm 135a which is attached to the footplate 130 may protrude outside of the fixed arm portion 135b. This can allow the swinging portion of the arm 135a to pivot about the hinge 136 axis so that the angle between the two portions of the arm (135a, 135b) can be maneuvered to less than 180 degrees. The two portions of the arm 135 may move with little friction between them with the bulb 139 pressed and the arm spring 137 compressed.

Loading (Engagement Into the Collection Position)

The entire device 100 can be "loaded" and deployed from a small craft, such as a kayak. One purpose of loading the device can be to forcibly position the cap 125 and/or the footplate 130 in open positions, such that a sample can be collected within the core tube 105 when the device is placed in sediment as described below.

Referring now to FIG. 2, FIG. 2 can show the device 100 when it has been "loaded" (engaged into the collection position) on the SDS 118. To load the device 100, the user can attach the collection frame 110 to the SDS 118. When frame is positioned within SDS 118, SDS 118 can provide for sufficient resistance to allow a force to be applied to device 100 to force the cap 125 and the footplate 130 into respective open positions (the force can be provided by hand, by the user). The trigger pole 115 can be attached to the collection frame 110 using the attachment pin 117. The releasable fastener 145 (or releasable mechanism) may be attached to the trigger pole 115. The releasable fastener 145 may include one or more links, which can allow for one or more degrees of freedom for the releasable fastener, and or the to pivot and/or rotate about. The releasable fastener 145 may be attached to the trigger pole 115 via a releasable fastener coupler 146. The releasable fastener coupler 146 may be a linkage system that can include one or more links, which may allow for one or more degrees of freedom for the releasable fastener 145 to pivot and/or rotate about. The size of the coupler 146 (and/or the releasable fastener 145) may be such that the distance between the cap 125 and the point at which the releasable fastener 145 is coupled to the trigger pole via the releasable fastener coupler 146, is small enough to maintain the cap 125 in the open position when the cap 125 is attached to the releasable fastener 145. In general, the length of the connection between the releasable fastener 145 and the trigger pole 115, may be such that when the cap 125 is connected to the releasable fastener 145, the cap can remain open and a sample can enter the core tube 105 via the aperture defined by edge 106. The releasable fastener 145 may be coupled to the trigger pole 115, via the coupler 146 (or otherwise), such that the releasable fastener 145 can remain attached to the trigger pole 115 for the duration of use of the device, including when the sufficient force is applied at the releasable fastener 145.

Further, and as shown in FIG. 2, the cap 125 can be opened by attaching to the releasable fastener 145 (or releasable mechanism, resettable fastener, or quick release mechanism), such that the cap 125 is not obscuring the aperture defined by edge 106 of the core tube 105. The collection frame 110, which can be attached to the SDS 118, can allow for sufficient force for a user to press down on the bulb 139 with one hand on the bulb, and the other hand free to rotate the footplate 130. The bulb 139 may be pressed so that the foot 130 can pivot away from the core tube 105 edge 107. Pushing down on the bulb compresses the spring 137 loaded portion of the arm, which pushes swinging portion 135a of the arm out of the fixed, sleeve portion 135b of the arm, and allows the user to pivot the footplate 130 away from core tube 105. The footplate 130 can be positioned so that is positioned near the arm spring 137, and the footplate 130 is not obscuring the aperture defined by core tube 105 edge 107. The footplate 130 can be connected to releasable fastener 145 via a braided (or other rope) metal rope footplate connector 143. This should open the footplate 130 into the collection position, despite the footplate being biased closed by the force of the arm spring 137 acting on the swinging portion of the arm 135a. A flotation device 144 can be connected to the footplate connector 143. The releasable fastener 145 (or releasable mechanism, or hook with quick release pin/trigger) may be releasably attached to the cap 125 and the footplate connector 143 (and thus the footplate 130 via the footplate connector 143). The releasable fastener 145 may be attached to the cap 125 and footplate 130 (via the footplate connector 143), at the same attachment point of the releasable fastener 145. It is appreciated that the releasable fastener 145 may have a hook (or bracket) and pin (or lug, stud, post) 148 configuration.

As shown at least in FIGS. 1A, 1B and 2, the trigger line 147, in proximity to the releasable fastener 145, can be spaced from the trigger pole 115 with a trigger line guide 149. The trigger line guide 149 can have an aperture through which the trigger line 147 is guided (or threaded), and it can be needed because the pulling being effected on releasable fastener 145 is being applied remotely. Guide 149 can cause the force (which is applied remotely) to act locally on the coupler 146 to disengage pin 148 and release cap 125 and footplate 130. The trigger line guide 149 can have a member mounted on the outside of the trigger pole 115. The trigger line guide 149 can be attached perpendicular to the trigger pole 115. The trigger line 147 may be attached to the trigger pole 115, at the end of the trigger pole 115 opposite the collection frame 110. The trigger line 147 can be attached to the trigger pole 115 via a reel (not shown). The trigger line 147 may be spooled around the reel as a fishing line, and to apply the sufficient force on the trigger line 147, the trigger line 147 can be pulled on via reeling the reel.

For clarity, FIG. 1B shows an enlarged view of a portion of the device shown in FIG. 1A, taken along line 1B-1B of FIG. 1A. The releasable fastener 145 can be coupled to the trigger pole 115 via coupler 146. The releasable fastener 145 can have a hook and pin 148 configuration, with the trigger line 147 coupled to the pin 148. The trigger line 147 can be coupled to the pin 148 via one or more links, to allow for one or more degrees of freedom of pivoting/rotating. The pin can have a central axis a. The pin 148 can be resettable. The trigger line can be guided by the trigger line guide 149.

As shown in FIG. 2, one end of cap spring(s) 150 can be connected to the core tube 105 (and/or the collection frame 110 and/or arm 135). The other end of the cap spring(s) 150 can be connected to the cap 125, and the length can be chose so that the cap spring 150 is extended beyond a natural spring length and a compression force biases the cap 125 closed. The releasable fastener 145 should be selected, positioned, and/or designed such that the biasing force of the cap spring(s) 150 does not engage the releasable fastener 145 (or release the cap 125 from the releasable fastener 145). The cap spring(s) 150 may be hooked onto posts established by cap spring screws 154 and secured. When opening the cap 125, it may be easier for a user to open the cap 125 after the cap spring(s) 150 are uncoupled from the cap 125 and/or the core tube 105. The cap spring(s) 150 may be uncoupled by loosening or removing one or more of the cap spring screws 154. When the cap 125 is secured to the releasable fastener 145 to open the cap 125 as described above, the user can make sure the cap spring(s) 150 are attached to the cap 125 and the core tube 105 (i.e. via the screws 154). The SDS 118 can also provide for sufficient resistant to attach the cap spring(s), and thus bias the cap 125 closed.

The adjustable sediment hard stop 116 can allow the user to increase or decrease the needed volume of sediment collected in the core tube 105 by the SUBS device 100. For example, the hard stop 116 may be adjusted from 0 cm to 21.59 cm from the foot-end of the core tube 105 (i.e. the bottom opening of the core tube 105 defined by edge 107). The adjustable sediment hard stop 116 may be removable from the device 100. Lastly, any pressure release valve(s) (not shown) can be tightened.

SDS 118 can allow for sufficient resistance for "loading". When finished loading, the cap 125 and/or the foot 130 can be in the open (or collection) position, whereas they can be biased closed via the springs (150, 137), and the adjustable hard stop 116 should be adjusted (if needed). Once "loaded", the collection frame 110 can be removed from the SDS 118.

Sample Collection

For sample collection, and referring now to FIG. 3, FIG. 3 illustrates the collection device 100, once "loaded" into the collection position, without the SDS 118. For collection, the SDS 118 can remain on the small craft, whereas the rest of the device can be submerged. With the SDS 118 removed from the device 100, the core tube 105 can then be submerged into the one or more subtidal substrates for collection. The substrate can be a water column. A user can control the device via the trigger pole 115. The user can hold the end of the pole 115 farther from the end of the pole 115 attached to the collection frame 110. With the pole 115 attached to the collection frame 110, the SUBS device 100 can reach depths as deep as the length of the pole 115 plus the length of the device 100 (without the SDS 118).

Some embodiments can include variations which can include a pressure release valve in the cap (not shown in FIGs.), and core tube 105 with small silicone mesh covered hole(s) 153 (for example, having a sieve structure with 2.54 cm diameter and <0.50 mm pore size) to allow for slow release of water but retention of a macroalgae-substrate and/or sediment-substrate within the core tube 105. The mesh covered hole 153 may define an opening in the core tube 105.

The portion 155 of the core tube 105 beyond the hard stop 116 can be dug into a sediment-substrate (i.e. intertidal benthic sediment), and the hard stop 116 will prevent the unexposed (by sediment) portion of the core tube 105 from filling with sediment. That unexposed portion of the core tube 105 could fill with one or more other substrates, such as water, algae, etc.). It can be appreciated that the substrates collected in core tube 105 of the present invention according to several embodiments can include one or more sediments with varying compositions and densities.

Figure 4:
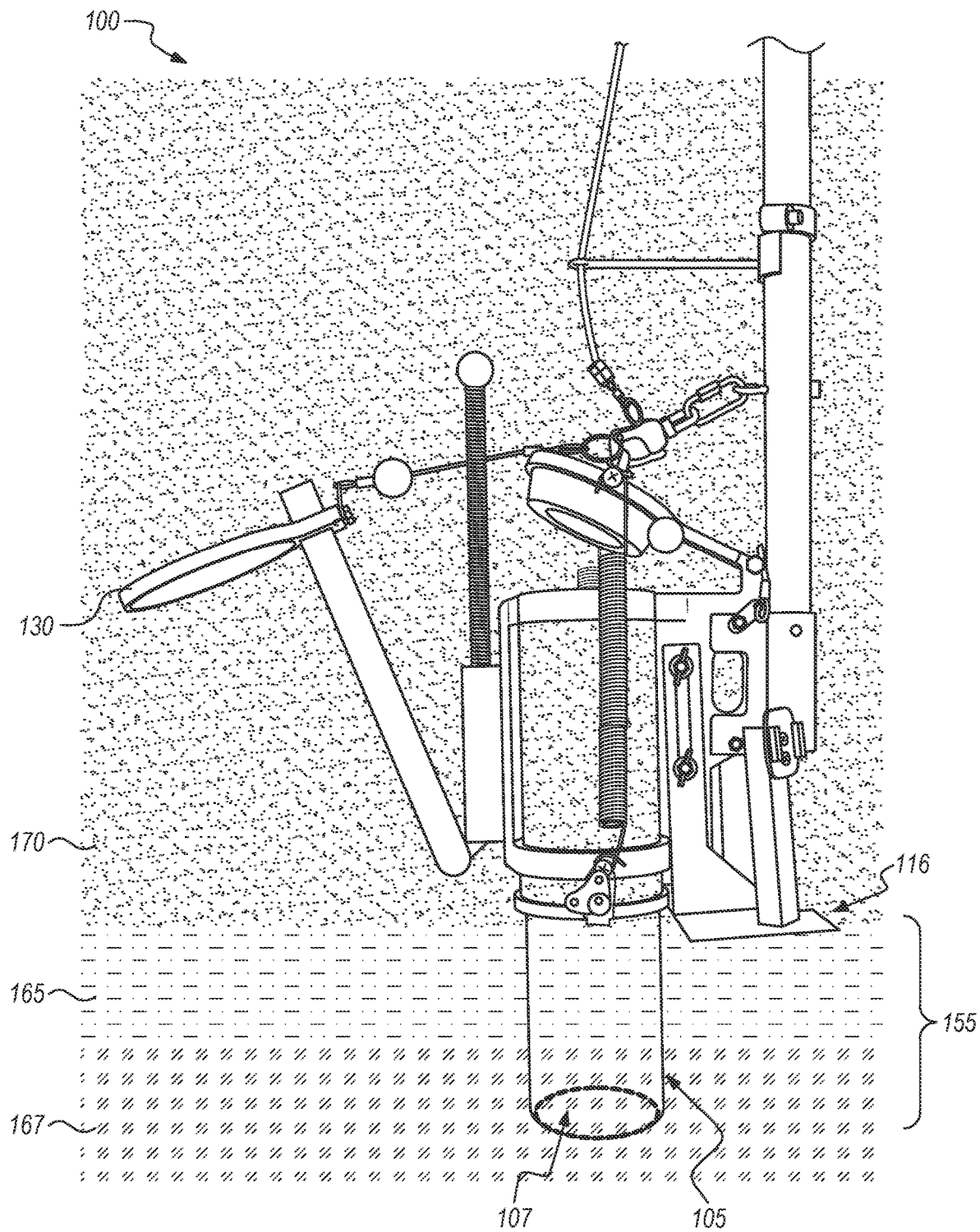
FIG. 4 can illustrate the device, including the hard stop contacting a sediment-substrate.

FIG. 4 can show the device 100 as device 100 is taking a sample, with the portion 155 of the core tube 105 beyond the hard stop 116 dug into a sediment-substrate. The sediment-substrate can include two different types of sediment 165, 167, but can include any type of sediment, compositions of sediment, and/or number of compositions of sediments. The portion 155 of the core tube 105 beyond the hard stop 116 may also be dug into a biomass substrate, such as benthic biomass. Liquid substrate 170, such as estuary water mixed with algae, can also be collected within the portion of the core tube 105 above the sediment (e.g. the portion of the core tube other than portion 155). Once the device 100 (e.g. the edge 107) reaches the sediment surface boundary (e.g. the interface between substrate 170 and sediment 165 substrate) the device 100 can be gently twisted into the sediment 165, 167, by pivoting the trigger pole 115 left to right until the sediment 165 hits sediment hard stop 116. The sediment 165, 167 volume collected in the portion 155 of the core tube 105 may depend on if a long or short core tube 105 is used, and further depend on the adjustment setting of the sediment hard stop 116. Alternatively, without a sediment hard stop 116 (not shown in FIGs.), the user can put the device into the sediment and/or substrate until the user believes a sufficient sample has been collected within the core tube 105.

Figure 5A:
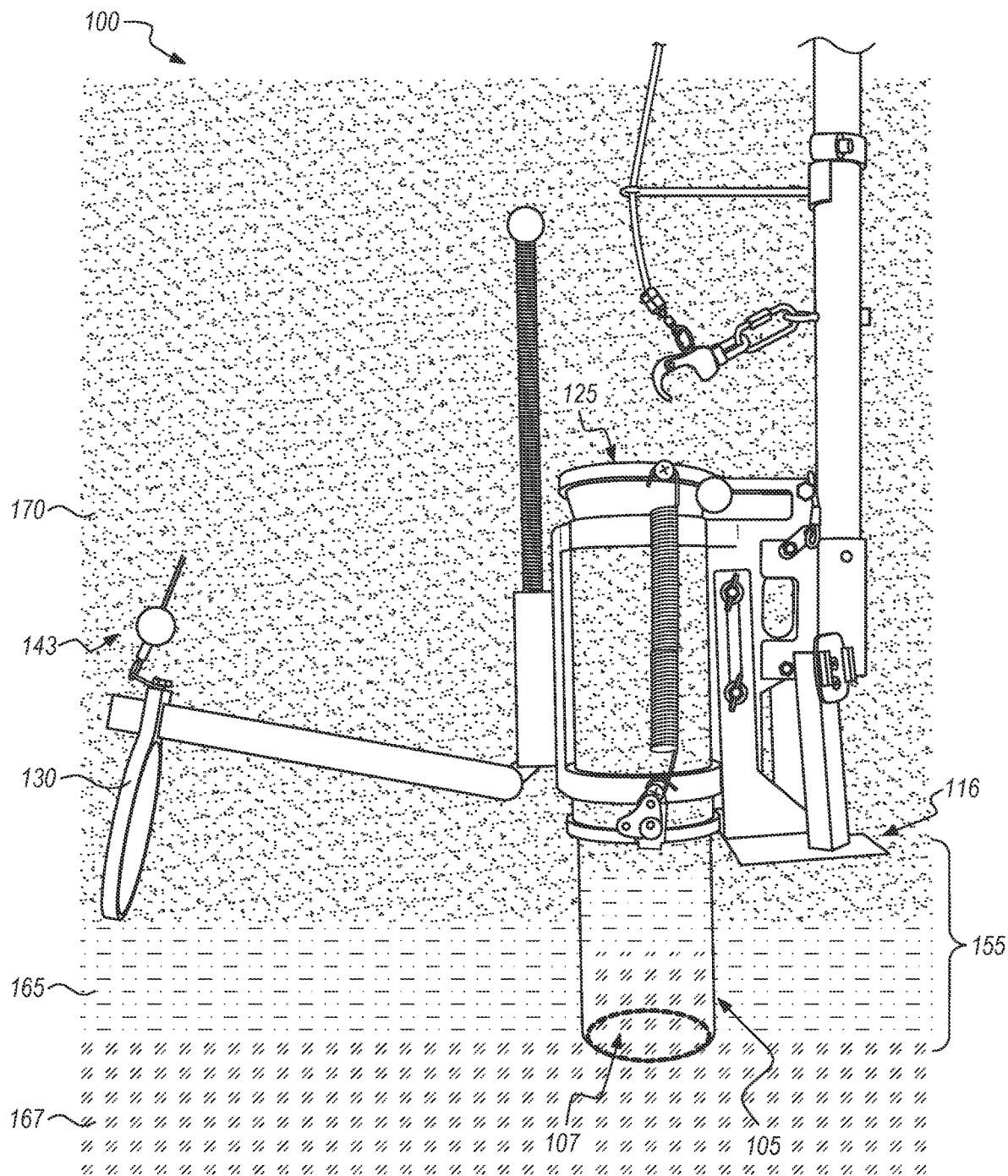
FIG. 5A can illustrate the device with the cap in the respective closed position, with the sample inside the core tube of the device.
Figure 5B:
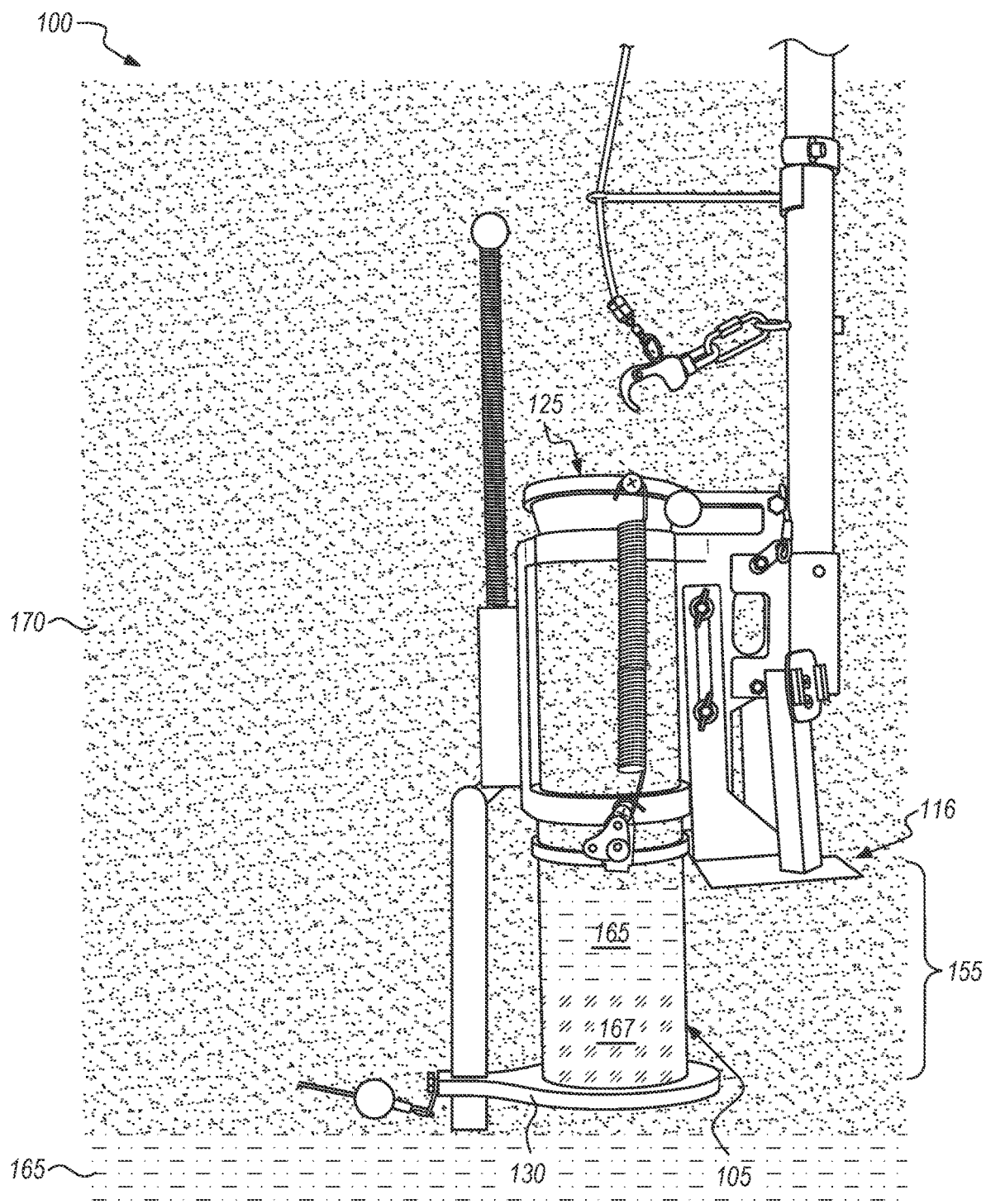
FIG. 5B can illustrate the device with the cap and footplate in respective closed positions, with the sample inside the core tube of the device.

Referring now to FIGS. 5A-5B, once the user believes a sufficient sample has been collected or once the core tube 105 is inserted into the sediment 165, 167. Tube 105 can be inserted to the desired depth, or at least until the sediment hard stop 116 reaches an interface boundary of substrate 170 and sediment 165 substrate, as shown in FIG. 4. The user can apply a force on the trigger line 147, to engage the releasable quick release fastener 145 that is attached to cap 125 and footplate 130 (via the footplate connector 143). The user may engage the trigger line 147 at a portion of the trigger line 147 near a portion of the trigger pole 115 opposite of the collection frame 110 (or via a reel, not shown in FIGs.). In several of the embodiments, the force may be applied on the trigger line 147 automatically when the hard stop 116 reaches the interface boundary between substrate 170 and sediment 165 substrate. This automatic force on the trigger line 147 may be applied when a force is applied on the hard stop 116, such as a force from the sediment-substrate 167 touching the hard stop 116.

Figure 6:
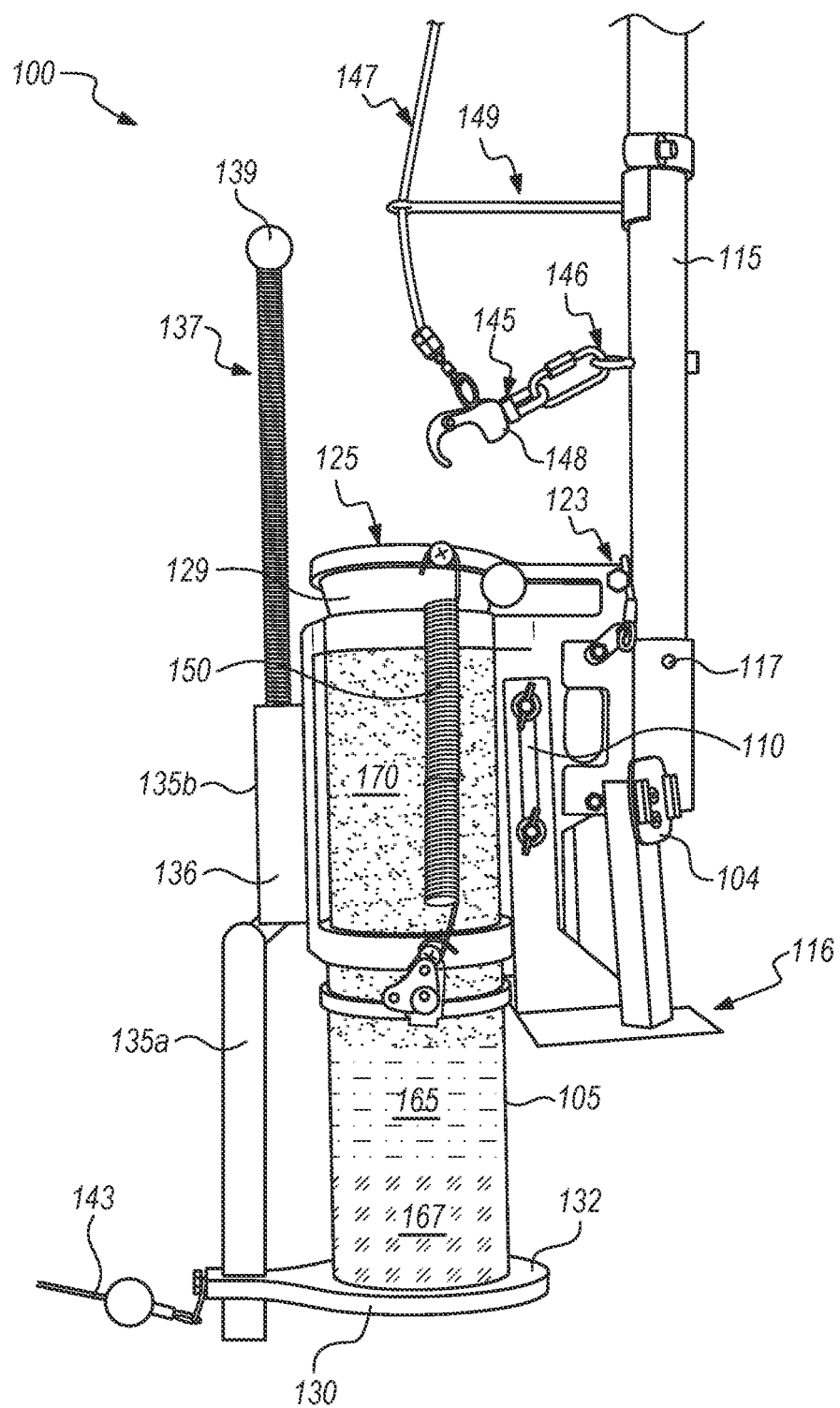
FIG. 6 can illustrate the device with the cap and footplate in respective closed positions and a sample of multiple substrates collected while the device has been removed from the substrates.

As shown in FIGS. 5-6, the quick release fastener 145 releasing the cap 125 and footplate 130 (via the footplate connector 143) will engage the sampler device 100 into a closed position. The trigger line 147 is attached to the releasable fastener 145 such that with a sufficient force applied on the releasable fastener via the trigger line 147, the cap 125 and the footplate 130 (via footplate connector 143) can be released from the releasable fastener 145. The sufficient force may be at least a portion of a pulling force on the trigger line 147. The sufficient force may be applied to the releasable fastener 145 via the trigger line 147. At least a component of the sufficient force may be applied to a resettable pin 148 of the releasable fastener 145, as the trigger line 147 maybe attached to that pin 148. The trigger line guide 149 may control the angle between the trigger line 147 and the central axis "a" of the pin 148. The trigger line guide 149 may allow for the force applied on the trigger line 147 (or a component of the force thereof), to transfer to the pin 148 of the releasable fastener 145, in a direction substantially along a central axis "a" of the resettable pin 148 (see FIG. 1B). For example, the component of the force applied to the trigger line 147 that can be applied to the pin 148, can be the force applied to the trigger line 147 times the cosine of the angle between the trigger line and the pin's 148 central axis a. of the resettable pin 148 (see FIG. 1B). Thus, the pin 148 may be dislodged so that the releasable portion of the releasable fastener 145 (such a hook), can release the cap 125 and/or footplate 130.

A pulling force on the trigger line 147 may create a force substantially perpendicular to a plane of the cap 125 via the releasable fastener 145 and the trigger line 147. This force may be a projected component of the force from the trigger line 147. The force may applied while the cap 125 and the footplate 130 are maintained in respective open positions. The magnitude and direction of the force can be sufficient for allowing the releasable fastener 145 to release the cap 125 and the footplate 130 (via footplate connector 143) to release from the releasable fastener 145.

After the trigger line 147 is pulled and the cap 125 and footplate 130 release from the releasable fastener 145, it is appreciated that the device 100 may be removed from the sediment 165, 167. The footplate 130 may be closed by lifting the device 100.

FIGS. 5A, 5B, and 6 shows the device 100 with the cap 125 and the footplate 130 as released from the releasable fastener 145. The trigger line 147 has been pulled, which has pulled resettable pin 148. The pulling of pin 148 can cause releasable fastener 145 to open, which further releases footplate 130 and cap 125, which allows springs 137 and 150 to relax and pivot footplate 130 and cap 125 back to a closed position. This sequence of event can cause the SUBS device 100 to collect samples by creating a tight vacuum seal when the trigger line 147 is pulled, triggering the closing of the footplate 130 and cap portions of the collection frame 110.

Once trigger line 147 has been pulled and the device cap 125 and foot 130 are in (or approximately) the closed positions, the device can be pulled out of the sediment and/or substrate (such as water column). An approximately closed position may be the cap 125 and/or footplate 130 released from the releasable fastener 145, biased closed, with sediment between the cap 125 and/or footplate 130 and the collection tube 105.

Now referring to FIG. 5A, the above is described in more detail. In FIG. 5A, pin 148 has been pulled to release cap 125 and footplate 130 from releasable fastener 145. With cap 125 released, it is likely that the cap 125, as biased via the spring(s) 150, will close right away. However, if the device has been inserted into a sediment 165, 167 (at least up to sediment hard stop 116), the footplate 130, may not close right away when released by the releasable fastener 145 because it is prevented from closing by sediment 165, as shown in FIG. 5A. Even though released from the releasable fastener 145 and biased closed via the spring 137, the footplate 130 may not close until the device 100 is lifted. FIG. 5A shows the footplate 130 starting to close as the device 100 is lifted out of the sediment-substrate 167, 165. It is appreciated that the partial vacuum cause by the cap 125 being forced closed may cause the sample, including the sample of sediment-substrate 167, 165, to be retained within the core tube 105.

FIG. 5B shows the device with the cap 125 closed and the footplate 130 closed once the device 100 has cleared the sediment 165 as device 100 is being raised out of the sediment 165, 167 (as shown in FIG. 4). It is appreciated that the footplate 130 will close at least when the bottom end of the core tube 105 (e.g. proximal to edge 107) will clear the sediment 165 as the device 100 is being lifted. It is appreciated that raising the device 100 may cause the cap 125 and the footplate 130 to simultaneously be closed once the second end clears the sediment 165, to establish a watertight compartment within the core tube 105.

With the cap 125 and the footplate 130 in respective closed positions as shown in FIG. 5B and FIG. 6, the device 100 can maintain a watertight compartment within the core tube 105, such that the sample remains in the internal region of the core tube 105. Moreover, a vacuum seal may be maintained between the cap 125 and the first end of the core tube at edge 106. In addition, a vacuum seal may be maintained between the footplate 130 and the second end of the core tube at edge 107, such that the sample remains confined in the substantially watertight region defined by core tube 105, cap 125 and footplate 130.

FIG. 6 can show the device 100 completely pulled out of the sediment, including the sample consisting of three example substrates 165, 167, 170. The device 100 can be lifted and reattached to the SDS 118 (not shown in FIG. 6, please see FIG. 1A). The trigger pole 115 may be optionally removed. For the last sample, the trigger pole 115 may be released from the collection frame 110. The sample can be removed from the device (as explained in example sample removal procedures below). The device can be reloaded as described in relation to descriptions of FIG. 2.

Figure 7A:
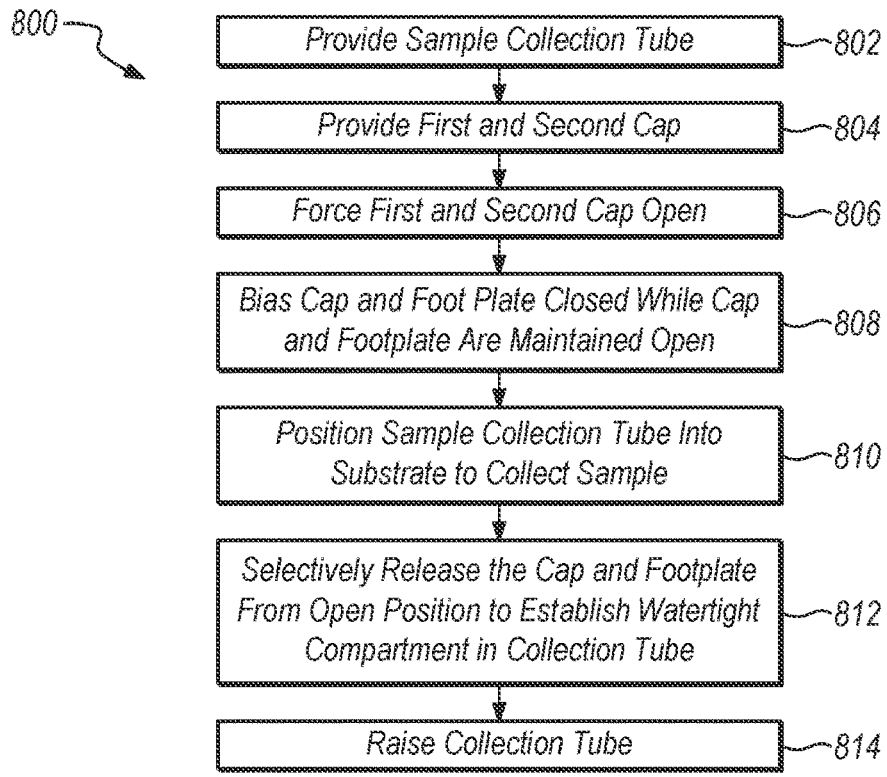
FIG. 7A can be a block diagram, which can depict steps that can be taken to accomplish some of the methods of the present invention according to several embodiments.
Figure 7B:
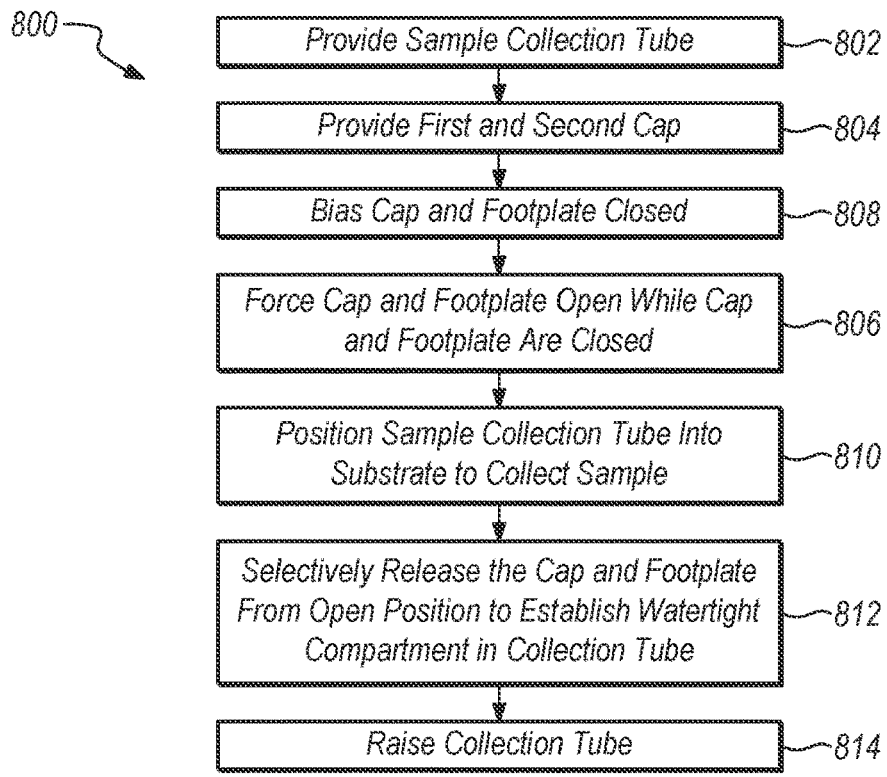
FIG. 7B can be another block diagram, which can depict steps that can be taken to accomplish some of the methods of the present invention according to several embodiments.

Referring now to FIG. 7A and FIG. 7B, a block diagram 800 can be shown, which can depict steps that can be taken to accomplish the methods of the present invention according to several embodiments. As shown, method 800 can include the initial step 802 of providing a sample collection tube 105. The sample collection tube may have the structure described in the embodiments herein. As shown by block 804, another step can be to provide cap 125 and footplate 130. In block 806, the cap 125 and footplate 130 can be forced open. The cap 125 and footplate 130 can be forced open by attaching to releasable fastener 145, including at the same attachment point. As shown by block 808, the cap 125 and footplate 130 can be biased closed. This step depicted by block 808, can be performed by cooperation of structures that include arm 135 and arm spring 137 for biasing footplate 130, and spring(s) 150 for biasing the cap 125. The device 100 as shown in relation to performing the steps shown in block 808 can be seen at least in FIGS. 2-3.

As shown by block 810, the sample collection tube 105 can be positioned into substrate(s) for collecting the sample. The device 100 as shown in relation to performing the steps shown by block 810 can be seen at least in FIG. 4. As shown by block 812, the footplate 130 can be selectively released from the open position to establish a watertight compartment in the collection tube 105. In a hook and pin configuration of the releasable fastener 145, the step of releasing the footplate 130 as shown in block 812 can be accomplished by pulling the trigger line 147 guided by trigger line guide 149. The trigger line 147 can be attached to the pin 148, and the trigger line guide 149 can allow a component of the force, which is applied to the trigger line to be applied in a direction substantially along the center axis of the pin 148. As shown by block 814, the collection tube 105 may be raised. This raising step shown in block 814 may cause the cap 125 and the footplate 130 to close, either simultaneously or sequentially, once the collection tube 105 clears one of the substrates. The device 100 performing the raising step shown in block 814 may be seen at least in FIGS. 5-6.

While FIG. 7A can show step of block 806 performed before the step of block 808, FIG. 7B can show the step of block 808 performed before the step of block 806. The method steps shown in block diagram 800 can be accomplished using the structure and cooperation of structure described herein.

Method for Collecting Sample Using the Device 100

The user may use the device 100 on a craft to collect a sample. The user may have on the craft(s), sample device 100; labels, sample bags; gloves, buckets or dish bins; estuary water in squirt bottle (except for sample device 100, not shown in FIGs). For biomass collection, the user may additionally have kitchen strainers, or 0.750 mm (or less than 1 mm) sieve, and suction tubing. For biomass and sediment collection, the user may additionally have centrifuges tube, foil, etc. The user may establish a sample frame and sample location within a grid of sample locations. The sample location should be the same for each sampling period. It may be preferred to collect three samples per sample location (site). The user may a kayak (or small vessel) to access deep areas of the estuary. Shallow areas of the estuary may be accessed by wading and/or diving. The user may make sure to disturb sampling areas as little as possible. The user may use GPS to find a sampling point. The user may record coordinates. Coordinates can be the same for each sampling period at the sampling location. At the sampling location, the user may then collect a sample by operating the device 100 as described in relation to FIGS. 1-7. The user may then remove the sample from the device 100 as described below.

Method for Removing Sample from the Device 100

The user will have to discern what type of substrate has been collected, or needs to be collected from the sample collected within the core tube 105. The sample may be biomass substrate. Biomass can be removed from SUBS device 100 by first suctioning out water into a strainer (not shown in FIGs) over the collection bin (not shown in FIGs) or by dropping entire sample (sediment, macroalgae, and water) into the strainer. To collect biomass by first removing water from the core tube 105, the user can first place a collection bin under the sampler device 100 (such as under the core tube 105). This will ensure no sample is lost should pressure release and water pour out when the cap is opened. Next, spring(s) 150 can be released, and cap 125 opened. This may break vacuum seal between cap 125 and the core tube 105. The user can then place the sieve over the collection bin. The user can siphon off water using small gauge flexible suction tubing. Water can be siphoned off into the sieve to avoid loss of smaller pieces of biomass that might be pulled up during the siphoning process. Once water has been removed, footplate 130 can be removed from the closed position by pushing down on spring portion 137 of frame arm 135 (e.g. via the bulb 139). Sediment and/or water and/or macroalgae may be dropped into the sieve. The sieve may be over the collection bin. As necessary, the user can use the squirt bottle to flush any biomass, which might be stuck internal to core tube 105, into the sieve/collection bin. The squirt bottle may have been loaded with estuary water.

The user may rinse any mud as necessary and remove biomass from sieve, and carefully place biomass into pre-labeled bag. The user may make sure to remove any biomass that might have fallen into collection bin and add that biomass into the same collection bag.

To collect biomass and/or sediment without first removing water, the user may place collection bin under sampler device 100 and place a sieve over a collection bin. Next, the user may release spring(s) 150 from frame and open cap 125 enough to break the vacuum seal between the cap 125 and the core tube 105. Once the seal has been broken, the user may push down on the arm spring 137 via the bulb 139 to open the footplate 130. The sample should then drop into the sieve atop collection bin. If using SUBS device 100 to collect macroalgae, the user may then pick out any algae from the sieve and place into pre-labeled collection bag.

In other embodiments, for example for BCA (Bicinchoninic Acid) protein assay analysis, the entire sample would be placed into a collection bin and/or bag for post processing. In these embodiments, the sample may have been collected with no hard stop 116 on the device, so the full core tube 105 could be submerged into the sediment-substrate.

If using the device 100 to collect a sediment-substrate, water can be drained before the sediment-substrate is removed from the core tube 105. Water can first be removed by either i) before pushing down on bulb 139 and/or arm spring 137 to release the foot plate 130, allowing water to slowly drain via the mesh covered hole 153 into a collection bin, or ii) before pushing down on bulb 139 and/or arm spring 137 to release the foot plate 130 but after releasing the cap 125, using a syringe (or small diameter suction tube). The syringe can be inserted into the water (or other liquid substrate 170) via the aperture defined by core tube first edge 106, but being careful not to disturb the sediment.

Macroalgae, if present in the removed water, can further be collected (for example into a pre-labelled container) and removed from that water.

Further, to further remove macroalgae and/or sediment from the core tube (either after i) above or before/during ii) above, over the collection bin, as arm spring 137 and/or bulb 139 is slowly pressed and foot plate 130 opens, a cylindrical disk (such as a plexiglass and/or DVD size disk, not shown in Figs) of slightly larger diameter than the sampler core tube 105 can be applied at the core tube aperture defined by edge 107. The sediment and planktonic algae can slide out onto the disk as the disk is the removed after the foot plate 130 is fully opened. Macroalgae from surface layer (of disk), being careful to not disturb the sediment, and can be put aside for in field processing. The sediment can then be removed via a syringe.

Alternatively, or in combination with the methods above, to remove sediment after some or all of the water is removed (see i) or ii) above), a sediment syringe sampler can be inserted into the sediment collected from the SUBS device 100 while pulling up on the syringe plunger. The device 100 can be marked on the side of the sampler, so that the sediment syringe can be inserted into the core tube 105 of the device 100 (e.g. via the opened cap 125 at a repeatable depth). For example, the device 100 may be marked to indicate a 1 cm depth or a 2 cm depth). The sampler syringe can then be removed from the sediment sample. The plunger of the syringe may be pressed, so that the sediment is expelled. The sediment may be expelled such that only a portion (such as the top 1 cm or the top 2 cm) remains in the syringe. A pre-labeled (e.g. 50 mL) centrifuge tube may be opened, and the sediment remaining in the sampler syringe (e.g. the remaining 1 cm of sediment) is expelled into the centrifuge tube. The centrifuge tube and/or the remaining sediment can be stored in a cooler with ice. The sediment collection syringe process may be repeated so there are multiple sediment plugs (in centrifuge tubes) collected at each sampling point. The user may repeat core tube 105 rinse and biomass rinse and place into collection bag as described above. The bag can be stored in a cooler with ice. A recommended sample collection process can be repeated 3 times at each sampling point. Composite samples, for example composite sample of sediment-substrates from three collections (e.g. water-substrate, algae-substrate, sediment-substrate), can be created, where the samples of the same substrate type are combined (for example in a pre-labelled container) for post-collection.

In summary, the present invention uses a system and method to collect a sample of one or more substrates.

Further, it appreciated that the foregoing description of various embodiments allow for a repeatable, quantifiable method and device for collecting samples. It is further appreciated that the beveled cap 125 and footplate 130 biased by springs (150, 137), allow for repeatable forces acting to bias those components during each subsequent use of the device 100. It is appreciated that the beveled cap 125 and footplate 130 may be releasably attached to a single releasable fastener 145 (which is attached to a single release trigger line 147 for manipulation by a user), at a single attachment point allows for simultaneous release of the beveled cap 125 and foot 130. It is appreciated that the trigger line 147 directly attached to a pin 148 of the releasable fastener 145, may allow for a faster, consistent, repeatable, and/or easier releasing of the cap 125 and footplate 130. It is appreciated that the trigger line guide 149 may allow for applying the force to pull the pin of the releasable faster 145, substantially along a centerline of the pin 148. It may be appreciated that when the cap 125 and footplate 130 are in respective closed positions (as shown in FIG. 1) and in respective closed positions with a sample (as shown in FIGS. 5-6), and in open collection positions (as shown in FIGS. 2-4), the cap 125 and footplate 130 may be biased closed. The forces that bias the cap 125 and footplate 130 may be repeatably applied for multiple samples.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The foregoing description of various preferred embodiments have been presented for purposes of illustration and description. It is not intended to be exhaustive or to limit the invention to the precise forms disclosed, and obviously, many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device for collecting a sample of one or more substrates, comprising:
    a collection tube having a first end and a second end;
    a cap pivotable about the first end;
    a footplate pivotable about the second end;
    a releasable fastener, the releasable fastener configured to releasably attach to the cap and the footplate;
    a pole configured to be controlled by a user of the device for submerging the collection tube into the one or more substrates and for raising the collection tube;
    a trigger line coupled to the releasable fastener and configured to be pulled by the user of the device independent of the user controlling the pole to submerge and raise the collection tube;
    a trigger line guide configured to position the trigger line to activate the releasable fastener;
    wherein the cap and the footplate are configured to be biased closed so that a watertight compartment is established inside the collection tube when the cap and the footplate are closed; and
    wherein the cap and the footplate are releasably attached to the releasable fastener while the cap and the footplate are forced open, and further wherein the trigger line guide allows for a force which is applied to the trigger line to transfer to a component of the releasable fastener, so that the cap and the footplate are released into respective closed positions.

2. A method for collecting the sample of the one or more substrates with the device of claim 1, comprising the steps of:
    A) providing the collection tube having the first end and the second end;
    B) fixing the cap pivotable about the first end and the footplate pivotable about the second end;
    C) biasing the cap and the footplate closed, so that the watertight compartment is established inside the collection tube when the cap and the footplate are closed;
    D) forcing the cap and the footplate open by releasably attaching the cap and the footplate to the releasable fastener;
    E) positioning the collection tube into the one or more substrates to collect the sample; and
    F) selectively releasing the cap and the footplate from the releasable fastener, to re-establish the watertight compartment when the cap and the footplate close as the collection tube is removed from the one or more substrates.

3. The method of claim 2, wherein said step D) is accomplished by releasably attaching the cap and the footplate at a same attachment point.

4. The method of claim 3, wherein said attachment point is a geometric center of the cap.

5. The method of claim 2, wherein said step F) is accomplished by pulling the trigger line guided by the trigger line guide.

6. The method of claim 5, wherein the trigger line is attached to a pin of the releasable fastener, and the trigger line guide is configured to allow a component of the force which is applied to the trigger line to be applied in a direction substantially along a center axis of the pin.

7. The method of claim 6, further comprising the step of G) attaching the pole, wherein the trigger line guide is attached substantially perpendicular to the pole and the releasable fastener is pivotably attached to the pole.

8. The method of claim 2, wherein step A) further comprises mounting a stop to an outside surface of the collection tube.

9. The method of claim 8, wherein the watertight compartment is re-established when the cap and the footplate close as the collection tube is removed from a sediment-substrate.

10. The method of claim 9, further comprising the step of raising the collection tube out of the sediment-substrate.

11. The method of claim 10, wherein the raising step causes the cap and the footplate to simultaneously close once the second end clears the sediment-substrate, to establish the watertight compartment within the collection tube.

12. The method of claim 2, wherein said step E) requires removing the device from a stand, wherein the stand allows for accomplishment of step D) when the device is mounted in the stand.

13. The device of claim 1, further comprising:
a stop mounted to an outside surface of the collection tube.

14. The device of claim 13, wherein when the collection tube is submerged into the one or more substrates, and when the stop contacts a sediment-substrate of the one or more substrates, the sample of the one or more substrates collects within the collection tube, and the force is applied on the trigger line so that the cap and the footplate are released into the respective closed positions.

15. The device of claim 14, wherein the device is configured so that when the trigger line is pulled when the stop contacts the sediment-substrate, the cap is released into the respective closed position, and when the device is raised the sample remains in the collection tube, and when the second end clears the sediment-substrate, the footplate closes into the respective closed position to establish the watertight compartment within the collection tube.

16. The device of claim 15, wherein raising the device out of the sediment-substrate causes the footplate to close once the second end clears the sediment-substrate.

17. The device of claim 1, further comprising a stand, wherein the stand allows for sufficient resistance for biasing the cap and the footplate closed when the stand is coupled to the collection tube, and configuring the collection tube to be submerged into the one or more substrates requires uncoupling the collection tube from the stand.

18. The device of claim 1, wherein the device further comprises an arm coupled to the footplate, wherein the arm further comprises a mechanism operable to maintain the footplate in an open position and the respective closed position.

19. The device of claim 18, wherein the mechanism comprises a spring configured to bias the footplate closed, a fixed member fixedly coupled to the collection tube, and a swinging member fixed perpendicularly to the footplate, and when in the respective closed position, a force compressing the spring allows the swinging member to rotate and the footplate to be released from the respective closed position.

20. A device for collecting a sample of one or more substrates, comprising:
a collection tube having a first end and a second end;
a cap pivotable about the first end;
a footplate pivotable about the second end;
a releasable fastener, the releasable fastener configured to releasably attach to the cap and the footplate;
a trigger line coupled to the releasable fastener and configured to be pulled by a user of the device;
a trigger line guide configured to position the trigger line to activate the releasable fastener;
wherein the cap and the footplate are configured to be biased closed so that a watertight compartment is established inside the collection tube when the cap and the footplate are closed;
wherein the cap and the footplate are releasably attached to the releasable fastener while the cap and the footplate are forced open, and further wherein the trigger line guide allows for a force which is applied to the trigger line to transfer to a component of the releasable fastener, so that the cap and the footplate are released into respective closed positions; and
wherein the releasable fastener has a hook and pin configuration, wherein the trigger line is attached to the pin, and the trigger line guide is configured to allow a component of the force which is applied to the trigger line to be applied in a direction substantially along a center of the pin.

* * * * *